Oct. 22, 1968   J. CHAPPER   3,406,534
UNIVERSAL COUPLING
Filed Oct. 10, 1966
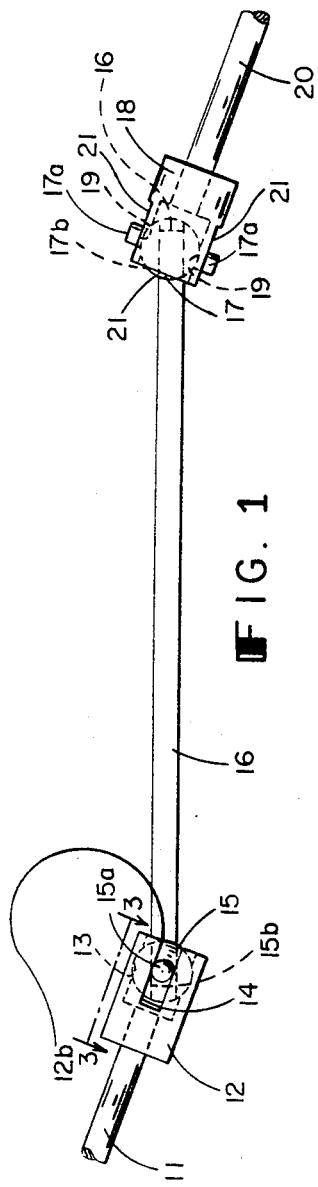
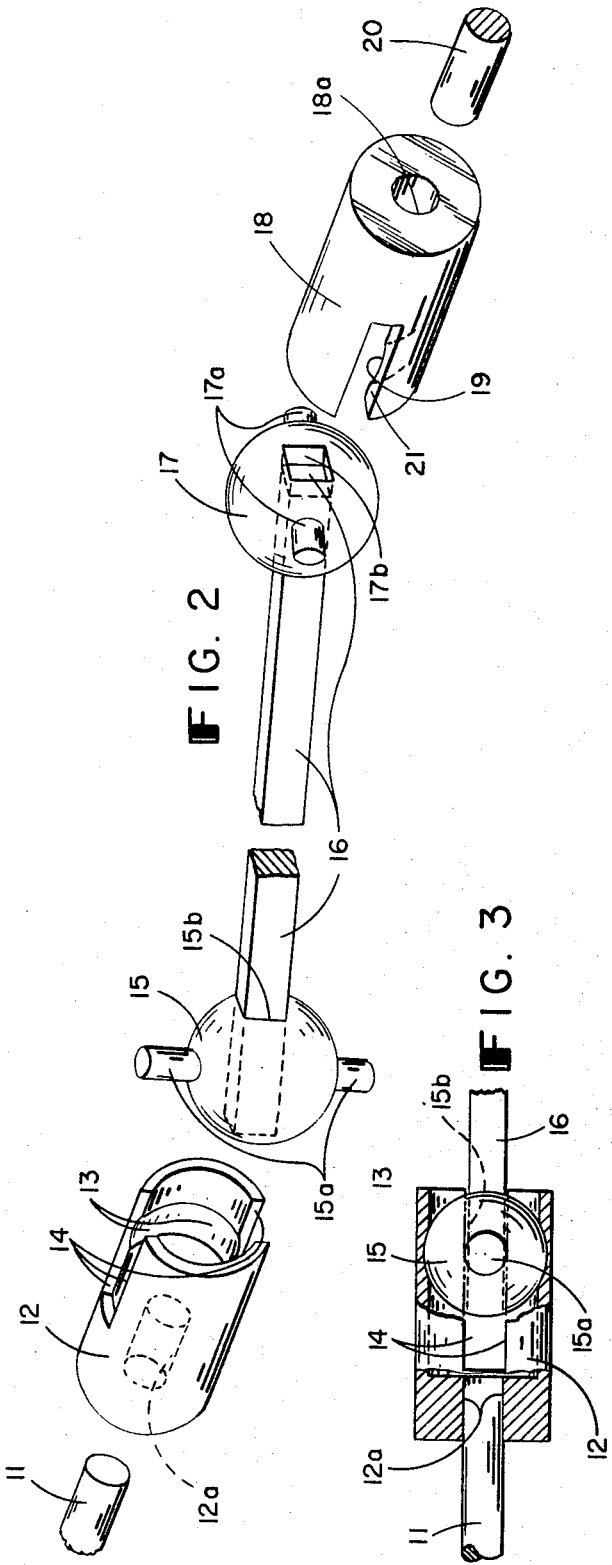
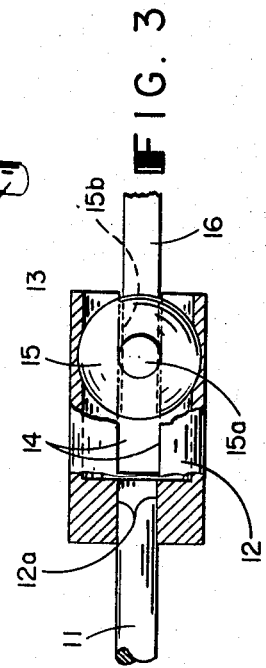

United States Patent Office 3,406,534
Patented Oct. 22, 1968

3,406,534
UNIVERSAL COUPLING
John Chapper, 44 Linden Ave.,
Swampscott, Mass. 01907
Filed Oct. 10, 1966, Ser. No. 585,613
3 Claims. (Cl. 64—7)

ABSTRACT OF THE DISCLOSURE

The invention comprises a universal coupling suitable for use with small component devices such as model trains. It can connect one drive shaft to another, is easily adaptable to different lengths, expandable for normal changes in distances between the shafts and quiet in operation. Its structure includes a ball which snap fits into a resilient socket having side slots and a transverse locking groove.

This invention relates to a coupling between two shafts that will permit transfer of torque from one shaft to the other. In particular it relates to such a coupling which has improved flexibility both in handling and operation.

In small component devices, as for example small lightweight mechanisms, model trains and the like, it is desirable to have a coupling that can connect one drive shaft to another and yet be inexpensive, easily adaptable to different length requirements, expandable for normal changes in distances between shafts being connected, and quiet in operation. Small size couplings that have been previously described lack one or more of the above stated desirable features.

It is one object of this invention to provide a universal coupling which is inexpensive, easily adaptable to varying lengths, expandable to allow for normal displacement of shafts, and quiet in operation.

Other objects and advantages will be apparent from the description which follows and the appended drawings wherein:

FIG. 1 is a side assembly view showing the coupling connected between two shafts.
FIG. 2 is an exploded view of FIG. 1.
FIG. 3 is a section along line 3—3 in FIG. 2.

The invention comprises broadly the combination of a socket firmly attached to a shaft, a ball snap-fitted into the socket, a driving rod firmly attached to the ball, a second ball in which the other end of said driving rod is longitudinally moveable, a second socket engageable with the second ball, and a second shaft firmly attached to the second socket. Each socket is made of resilient material, such as plastic, has longitudinal side slots extending inward from its open end and also has a transverse inner locking groove. Each ball has arms engageable with the slots and snap fits into the locking groove. The driving rod is preferably polygonal as are the orifices of the balls.

In assembly, the drive rod can be cut to any desired length, so that a minimum of components is needed. For maximum torque the arms of one ball are at right angles to the arms of the other. It should be noted that the second ball is free to slide on the rod while the first ball is firmly attached.

Referring now to the drawings, shaft 11 is press-fitted into rear opening 12a in a resilient socket 12. The front portion 12b of socket 12 is provided with longitudinal side slots 14 extending to the opening of the socket and a transverse inner locking groove 13.

Sphere 15 having arms 15a is dimensioned to snap fit into resilient socket 12 engaging groove 13 with arms 15a engaging slots 14. Drive rod 16 is rectangular in cross section and is press-fitted into orifice 15b in ball 15. The other end of drive rod 16 is slideable in orifice 17b of a second ball 17 which has arms 17a. Ball 17 is engageable with socket 18 in a similar manner, arms 17a engaging slots 21 of socket 18 and the ball 17 itself engaging locking groove 19. It is obvious that the original diameter of the interior of the sockets 12 and 18 is slightly smaller than the balls 15 and 17 to permit the resilient action of holding and locking into place. The rear orifice 18a is used for holding the second shaft 20 onto socket 18. The illustrated embodiment is made entirely of resilient plastic.

As is readily apparent from FIG. 2, the exploded view, the various components of this invention can be readily assembled and the drive rod 16 cut to the desired length. When assembled as shown in FIG. 1, shafts 11 and 20 will turn together. However, if for any reason the unit connected to shaft 20 moves longitudinally with respect to shaft 11, the torque action continues without any binding inasmuch as the drive rod will merely slide somewhat in the opening 17b. I have found that this embodiment is not only reliable and inexpensive, but also much quieter than prior art couplings.

I claim:

1. A universal coupling comprising in combination a socket firmly attached to a first shaft and having longitudinal side slots extending to its open end and a transverse inner locking groove; a ball snap-fitted into the socket and groove and having lateral extensions engageable with the slots; a driving rod firmly attached to the ball at one end and extending into an orifice in a second ball so as to be longitudinally moveable within said second ball, said second ball having lateral extensions; a second socket having slots engageable with the extensions of said second ball and a transverse inner locking groove engageable with said second ball; and a second shaft firmly attached to said second socket, said sockets having substantially cylindrical inner surfaces and being made of resilient material; said locking grooves being on said inner surfaces.

2. The combination of claim 1 wherein the driving rod is polygonal in cross-section.

3. The device of claim 1 wherein the slots of one socket are at right angles to the slots of the other socket.

References Cited

UNITED STATES PATENTS

| 1,188,965 | 6/1916 | Maxwell | 64—7 |
| 2,373,897 | 4/1945 | Jones | 64—7 |
| 2,595,936 | 5/1952 | Goode | 64—8 X |
| 3,098,365 | 7/1963 | Pearson | 64—7 |

HALL, C. COE, *Primary Examiner.*